United States Patent
Williams et al.

(10) Patent No.: US 8,949,844 B2
(45) Date of Patent: Feb. 3, 2015

(54) HARDWARE RESOURCE MANAGEMENT WITHIN A DATA PROCESSING SYSTEM

(75) Inventors: Michael John Williams, Ely (GB); Stuart David Biles, Great Barton (GB)

(73) Assignee: ARM Limited, Cambridge (GB)

( * ) Notice: Subject to any disclaimer, the term of this patent is extended or adjusted under 35 U.S.C. 154(b) by 1006 days.

(21) Appl. No.: 12/923,276

(22) Filed: Sep. 13, 2010

(65) Prior Publication Data
US 2011/0093750 A1    Apr. 21, 2011

(30) Foreign Application Priority Data
Oct. 21, 2009    (GB) .................................. 0918501.8

(51) Int. Cl.
G06F 9/455    (2006.01)
G06F 9/46    (2006.01)
G06F 7/04    (2006.01)
G06F 13/00    (2006.01)
G06F 9/50    (2006.01)

(52) U.S. Cl.
CPC ..................................... G06F 9/5077 (2013.01)
USPC ............... 718/104; 718/1; 711/117; 711/129; 711/153; 711/173; 726/2

(58) Field of Classification Search
None
See application file for complete search history.

(56) References Cited

U.S. PATENT DOCUMENTS

| | | | | |
|---|---|---|---|---|
| 4,253,145 | A * | 2/1981 | Goldberg .......................... | 703/21 |
| 6,160,734 | A * | 12/2000 | Henderson et al. ....... | 365/185.04 |
| 7,213,125 | B2 * | 5/2007 | de Dinechi et al. ........... | 711/203 |
| 7,467,381 | B2 * | 12/2008 | Madukkarumukumana et al. ................................. | 718/1 |
| 2005/0132365 | A1 | 6/2005 | Madukkarumukumana et al. | |
| 2005/0183065 | A1 * | 8/2005 | Wolczko et al. .............. | 717/124 |
| 2005/0204357 | A1 * | 9/2005 | Garg et al. ........................ | 718/1 |
| 2006/0026385 | A1 | 2/2006 | Dinechin et al. | |
| 2008/0028410 | A1 | 1/2008 | Cherkasova et al. | |

(Continued)

FOREIGN PATENT DOCUMENTS

JP    62-005441    1/1987
JP    63-271553    11/1988

(Continued)

OTHER PUBLICATIONS

Search Report for UK 0918501.8 dated Feb. 10, 2010.

(Continued)

*Primary Examiner* — Abdullah Al Kawsar
(74) *Attorney, Agent, or Firm* — Nixon & Vanderhye P.C.

(57) ABSTRACT

A processor 6 is provided with a plurality of hardware resources, such as performance monitors 12 and context pointers 18. Boundary indicating circuitry 14, 20 stores a boundary value which is programmable and which indicates a boundary position dividing the hardware resources into a first portion and a second portion. Resource control circuitry 16, 22 controls access to the hardware resources such that when program execution circuitry 8 is executing a first program it is responsive to a query as to how many off said plurality of hardware resources are present to return a first value whereas when the program execution circuitry is executing a second program it responds to such a query by returning a value corresponding to those hardware resources within the second portion.

28 Claims, 7 Drawing Sheets

(56) References Cited

U.S. PATENT DOCUMENTS

| | | | |
|---|---|---|---|
| 2008/0040715 A1* | 2/2008 | Cota-Robles et al. | 718/1 |
| 2008/0168258 A1 | 7/2008 | Armstrong et al. | |
| 2009/0222816 A1* | 9/2009 | Mansell et al. | 718/1 |
| 2010/0083247 A1* | 4/2010 | Kanevsky et al. | 718/1 |
| 2011/0061050 A1* | 3/2011 | Sahita et al. | 718/1 |
| 2012/0117614 A1* | 5/2012 | Sahita et al. | 726/1 |
| 2012/0221732 A1* | 8/2012 | Waldspurger | 709/226 |
| 2013/0060972 A1* | 3/2013 | Green et al. | 710/18 |
| 2013/0132695 A1* | 5/2013 | Heo et al. | 711/163 |
| 2014/0109090 A1* | 4/2014 | Bennett et al. | 718/1 |

FOREIGN PATENT DOCUMENTS

| | | |
|---|---|---|
| JP | 6-208464 | 7/1994 |
| JP | 2000-076133 | 3/2000 |
| JP | 2004-318544 | 11/2004 |
| JP | 2005-056017 | 3/2005 |
| JP | 2008-047129 | 2/2008 |
| TW | 200825904 | 6/2008 |

OTHER PUBLICATIONS

International Search Report and Written Opinion of the International Search Authority dated Dec. 6, 2010 for PCT/GB2010/051388.
Chinese Office Action mailed May 26, 2014 and English translation in CN 201080047900.1, 15 pages.
English translation of Taiwan Office Action dated May 30, 2014 in TW 099128701, 5 pages.
Japanese Office Action mailed Mar. 10, 2014 in JP 2012-534770 and English translation.
Japanese Office Action mailed Nov. 5, 2013 in JP 2012-534770 and English translation.
English translation of Taiwan Office Action received Jun. 16, 2014 in TW 099128701, 5 pages.
English translation of Taiwan Office Action issued Oct. 17, 2014 in TW 099128701, 4 pages.
GB Office Action issued Nov. 20, 2014 in GB 0918501.8, 2 pages.
European Office Action dated Oct. 14, 2014 in EP 10748128.5, 6 pages.
Israeli Office Action dated Oct. 2, 2014 in IL 217770 and partial English translation, 4 pages.

* cited by examiner

Resource Size Indication

Resource Read Circuitry

HARDWARE RESOURCE MANAGEMENT WITHIN A DATA PROCESSING SYSTEM

This application claims priority to GB Application No. 0918501.8 filed Oct. 21, 2009, the entire contents of which are incorporated herein by reference.

BACKGROUND OF THE INVENTION

1. Field of the Invention

This invention relates to the field of data processing systems. More particularly, this invention relates to the management of hardware resources within a data processing system.

Data processing systems typically have a number of hardware resources, such as performance monitor counters, configuration storage registers, debug event generation resources, trace resources etc. The number of these resources provided within a particular processor may be implementation specific.

2. Description of the Prior Art

Within the field of data processing systems there is an increasing trend towards the use of virtualization. Such virtualization may permit the software to be provided with an execution environment which appears to have one form from the point of view of the software whereas in reality it has a different underlying physical form. As an example, a processor may be provided executing hypervisor software responsible for managing the virtualization as well as one or more guest operating systems often executing at a level of privilege below that of the hypervisor software. The guest operating systems may be presented by the hypervisor software with an interface to the processor, such as an indication of the number of particular hardware resources available, that is different from the physical reality. This virtualization is normally managed by the hypervisor software trapping accesses to resources in software and then the execution of the hypervisor program serving to manage the response to the underlying guest operating system so as to give the appropriate response matching the virtual system being presented to the guest operating system. This process of trapping accesses and generating the appropriate responses in software under a hypervisor control can consume many hundreds of processor cycles and is comparatively slow to execute. In a paravirtualization approach the guest operating system may have the same level of privilege as the hypervisor and be "trusted" not to make use of some resources other than via an appropriate call to a published interface of the hypervisor.

Some of the hardware resources which it is desired to virtualize are illsuited to this approach of trapping the accesses and generating the appropriate response in software. As an example, it is increasingly useful to provide hardware performance counters within processors for monitoring aspects of system performance. A hypervisor program may use such performance counters to control parameters such as voltage and frequency scaling so as to reduce energy use by the processor whilst still meeting required performance standards. At another level, a guest operating system, or application program executing using that guest operating system, may employ hardware performance counters to control its own operation or as part of diagnostic/debug operations being performed during the development of that application software or guest operating system. In the context of such performance counters, the overhead of trapping accesses to the performance counters in order to support virtualization of these hardware resources is such that it significantly impacts the performance and behaviour of the software being monitored and hence the validity of the results generated. It is also desirable to be able to simultaneously support the use of the hardware resources by both the hypervisor program for its high level control and other programs, such as a guest operating system, for their different purposes. Furthermore, the number of hardware resources provided in the physical implementation may vary.

Another example of hardware resources requiring management within a virtualised system are context pointers used to point to configuration data of a system memory management unit. Within a system such as one supporting a secure domain and a non-secure domain (e.g. ARM Trustzone) it is often required to swap the configuration of the hardware memory management unit depending upon the environment to be presented to the software being executed. Hardware pointers indicating where this configuration data is stored provide a mechanism for rapid access to this data for save and restore purposes. Thus, trapping to software accesses to these pointers would have a detrimental impact on the speed with which contexts could be switched. Nevertheless, it is important that the system should be able to provide an appropriate environment including the number of these pointers as well as the ability to support different physical implementations in which the number of pointers may vary.

SUMMARY OF THE INVENTION

Viewed from one aspect the present invention provides apparatus for processing data under control of a plurality of programs, said apparatus comprising: a plurality of hardware resources with a predetermined sequence such that each of said plurality of hardware resources has a predetermined position within said sequence; boundary indicating circuitry configured to store a boundary value indicating a boundary position within said sequence, said boundary position dividing said sequence into a first portion on a first side of said boundary position within said sequence and a second portion on a second side of said boundary position within said sequence; program instruction execution circuitry configured to execute program instructions; resource control circuitry coupled to said boundary indicating circuitry and configured: when said program execution circuitry is executing a first program, to respond to one or more program instructions querying how many of said plurality of hardware resources are present within said apparatus to return a first value; and when said program execution circuitry is executing a second program, to respond to one or more program instructions querying how many of said plurality of hardware resources are present within said apparatus to return a value corresponding to those hardware resources within said second portion.

The present technique provides hardware support for dividing a plurality of hardware resources into a first portion and a second portion as indicated by a programmable boundary value. Resource control circuitry is provided such that when a first program queries how many of the hardware resources are present, a first value is returned whereas when a second program queries how many of the hardware resources are present, a value corresponding to those hardware resources within the second portion is returned. Thus, the first program and the second program may be given different views as to the number of hardware resources present. The first program and the second program can query this number so as to take account of the fact that different numbers of hardware resources may be present within different implementations. Furthermore, the different results returned for this query to the first program and the second program allow a separation between the use of the hardware resources that may be made by the first program and the second program.

As an example, the first value for the number of resources that is returned to the first program may correspond to a sum of the hardware resources within the first portion and the second portion. The first program may thus be permitted control over all of the hardware resources, whereas the second program is only aware of those hardware resources within the second portion and will restrict its interaction to those hardware resources within the second portion. As an alternative, the first value returned to the first program may correspond to the hardware resources within the first portion, giving access to those hardware resources to the first program.

The first program and the second program may operate at different privilege levels within a plurality of privilege levels supported by the program instruction execution circuitry. Within this environment, the resource control circuitry may be configured such that the first program executing at the first privilege level is permitted to write the boundary value under program instruction control whereas the second program executing at a second privilege level is not permitted to write the boundary value. In this way, the first program may control the view of the hardware resources which is presented to the second program. The resource control circuitry may be configured to respond in different ways to accesses to hardware resources within the first portion when the system is at the second privilege level. In a generic sense the resource control circuitry may give fewer access rights to these hardware resources within the first portion when operating at the second privilege level compared to when the program execution circuitry is operating at the first privilege level. One example of this would be that no access rights are given to hardware resources within the first portion when the program execution circuitry is operating at the second privilege level.

The precise responses to a query regarding how many hardware resources are present as returned to the first program or the second program can vary. In one embodiment the first program may be returned a true value of the number of hardware resources present and the second program may be returned a value specified by the boundary value.

The plurality of privilege levels may comprise a hierarchy of privilege levels with at least some privilege levels higher in the hierarchy having a proper superset of access rights to the hardware resources compared to privilege levels lower in the hierarchy.

In the above there has been described the system incorporating one boundary value to which the resource control circuitry is responsive. In further embodiments the boundary indicating circuitry may be configured to store a further boundary value with that further boundary value dividing the second portion into a further first portion and a further second portion. When operating at the second privilege level, a program will be permitted to write the further boundary value and to respond to a query regarding how many hardware resources are present with a value corresponding to a sum of those hardware resources within the further first portion and the further second portion. At the same time, a program operating at a third privilege level will not be permitted to write the further boundary value and will respond to a query regarding how many hardware resources are present to return a value corresponding to those hardware resources within the further second portion.

Thus it will be seen that the division of the hardware resources into a first portion and a second portion may be hierarchical with the second portion being further divided into a further first portion and a further second portion. In a similar way, the further second portion and so forth may be further subdivided by additional boundary values.

While it would be appreciated that the hardware resources managed by the present technique can take a wide variety of different forms, the present technique is well suited to embodiments in which the hardware resources comprise a plurality of entries within a table of pointers to configuration data of a memory management unit.

Within such embodiments the configuration data may comprise one or more of translation table base pointer register values; fault address and context register values; translation look aside buffer maintenance register values; virtual address to physical address operation register values; memory management unit configuration and control register values; context bank values comprising translation table base pointer register values, fault address and context register values, translation look aside buffer maintenance register values, virtual address to physical address operation register values and memory management unit configuration and control register values; bypass attribute register values; interrupt outputs raised in response to activity initiated by one or more of said first program and said second program; and transaction identification register values for mapping data streams.

In other embodiments to which the present technique is well suited the plurality of hardware resources may comprise a plurality of performance monitoring circuits. These performance monitoring circuits may comprise one or more of a plurality of counters comprising one or more of counter registers, enable registers, overflow status flags, and overflow event interrupt enable registers; and event selection circuits for selecting an event to count from a plurality of events.

A further example of a plurality of hardware resources to which the present techniques may be applied is one in which the plurality of hardware resources comprise a plurality of fields of a register accessed as a whole and being one of a configuration register and a status register with each of the plurality of fields representing a respective further resource and with the boundary values specifying which of the plurality of fields are accessible to the first program and which of the plurality of fields are accessible to the second program.

In this context, the plurality of hardware resources may comprise bits within a configuration register corresponding to respective ones of a plurality of performance monitoring circuits, each bit controlling some aspect of a corresponding performance monitoring circuit such as whether that circuit is enabled. This also applies to status registers when each bit reports some aspect of the corresponding circuit rather than controls it. There may be a many-to-one mapping of bits, e.g. a field of bits per circuit. A further example of a hardware resource to which the present technique may be applied is when the plurality of hardware resources comprise a plurality of registers for use by the first program or the second program. As an example, these registers may be mapping registers storing mappings to be used between data streams being accessed and associated processing contexts of the apparatus concerned.

If the second program attempts a read to a hardware resource within the first portion (i.e. the portion to which it does not have proper access), then in some embodiments a default value for the hardware resource may be returned. In a similar way, if the second program attempts to write to a hardware resource within the first portion, then the write will not be performed and exception (or fault) processing may be triggered.

The plurality of different privilege levels previously discussed can have a variety of different forms and uses. In one example in which the present techniques may be used the plurality of privilege levels include a hypervisor privilege level at which a hypervisor program executes to virtualised underlying hardware and an operating system privilege level at which an operating system program executes. The hypervisor program has access to those hardware resources within the first portion and those hardware resources within the second portion and the operating system program has access to only those resources within the second portion.

Another example environment in which the present technique may be used is one in which the plurality of different privilege levels includes at least one secure privilege level within a secure domain at which a secure program executes and at least one non-secure privilege level within a non-secure domain at which at non-secure program executes. In this context the secure program may have access to those hardware resources within the first portion and those hardware resources within the second portion whereas the non-secure program only has access to those hardware resources within the second portion.

The resource control circuitry as well as gating access to the hardware resources may re-index the plurality of hardware resources in dependence upon the boundary value. In this way, the different programs may access the resources as if they started from a set index value within a sequence of index values even though the physical resources to which those indices were mapped varied depending upon which portion was being accessed and the position of the boundary between the first portion and the second portion.

Viewed from another aspect the present invention provides a plurality of hardware resource means with a predetermined sequence such that each of said plurality of hardware resource means has a predetermined position within said sequence; boundary indicating means for storing a boundary value indicating a boundary position within said sequence, said boundary position dividing said sequence into a first portion on a first side of said boundary position within said sequence and a second portion on a second side of said boundary position within said sequence; program instruction execution means for executing program instructions; resource control means coupled to said boundary indicating means for: when said program execution means is executing a first program, responding to one or more program instructions querying how many of said plurality of hardware resource means are present within said apparatus to return a first value; and when said program execution means is executing a second program, responding to one or more program instructions querying how many of said plurality of hardware resource means are present within said apparatus to return a value corresponding to those hardware resource means within said second portion.

Viewed from a further aspect the present invention provides storing a boundary value indicating a boundary position within said sequence, said boundary position dividing said sequence into a first portion on a first side of said boundary position within said sequence and a second portion on a second side of said boundary position within said sequence; when said program execution circuitry is executing a first program, responding to one or more program instructions querying how many of said plurality of hardware resources are present within said apparatus to return a first value; and when said program execution circuitry is executing a second program, responding to one or more program instructions querying how many of said plurality of hardware resources are present within said apparatus to return a value corresponding to those hardware resources within said second portion.

The above, and other objects, features and advantages of this invention will be apparent from the following detailed description of illustrative embodiments which is to be read in connection with the accompanying drawings.

DESCRIPTION OF THE EMBODIMENTS

Figure 1:
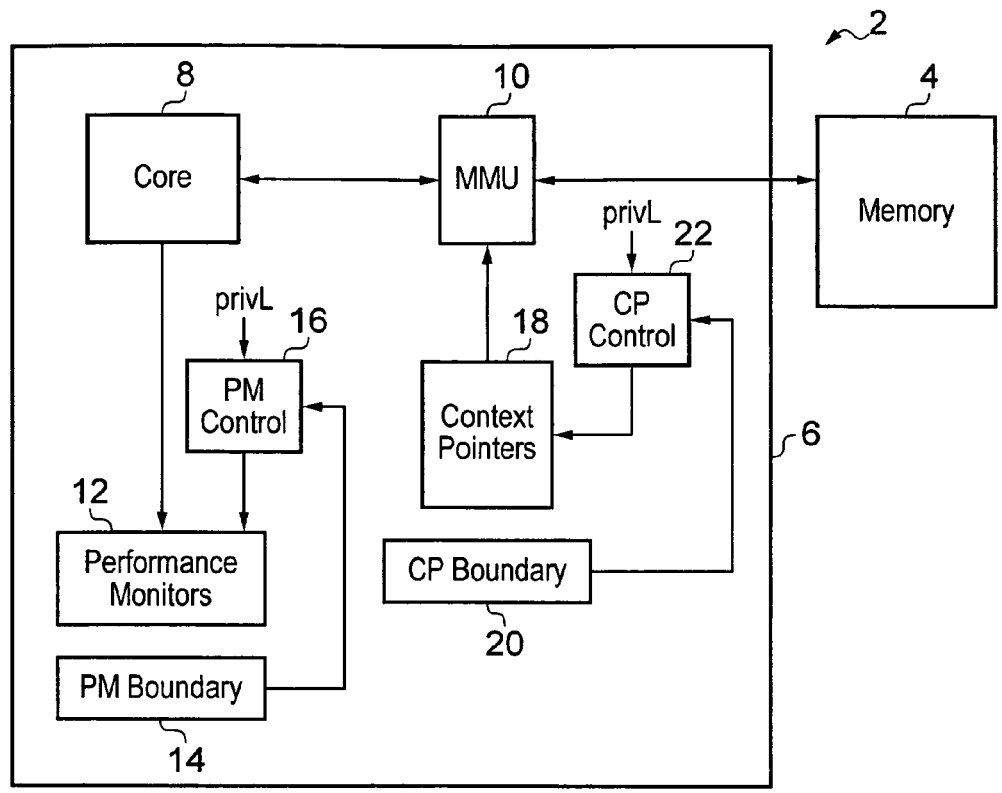
FIG. 1 schematically illustrates an apparatus for processing data under control of program instructions and including different types of hardware resources.

FIG. 1 schematically illustrates an apparatus 2 for processing data under control of a plurality of programs. The programs are stored within a memory 4, which is coupled to a system-on-chip integrated circuit 6. The integrated circuit 6 includes a processor core 8 which executes the program instructions read from the memory 4. The integrated circuit 6 also includes a system memory management unit (MMU) 10 for controlling access to the memory 4 at a system level, e.g. via an ARM AXI bus connecting other components (not shown). The integrated circuit 6 includes hardware resources which are made available to different programs executed at different levels of privilege in accordance with techniques described further below.

In this example, one form of the hardware resources comprises performance monitoring circuits 12 in the form of performance counters. Associated with these performance monitoring circuits 12 (which correspond to a plurality of hardware resources) there are provided a performance monitor boundary register 14 (boundary indicating circuitry) and a performance monitor control circuit 16 (resource control circuitry). The performance monitor boundary register 14 stores a boundary value indicating a division between performance counters within a first portion of the performance monitoring circuitry 12 and performance counters within a second portion of the performance monitoring circuitry 12. The performance counters within the performance monitoring circuitry have a sequence that is predetermined such that each of the hardware resources has a predetermined position within that sequence. Thus, by defining a boundary at a point within that sequence, it may be determine which performance counters fall within the first portion on one side of that boundary and which performance monitors fall within the second portion on the other side of that boundary.

The performance monitor control circuit 16 is supplied with a signal indicating the current privilege level at which the processor core 8 is operating and executing processing instructions. The performance monitor control circuit 16 is responsive to this privilege level to determine whether or not an access to one of the hardware resources (e.g. performance monitors or control switches for the performance monitors) is permitted when attempted by a program executed by the processor core 8. If the access is permitted, then it is allowed e.g. a write may be made or a read may be made. If the access is not permitted, then it will not be performed and a default action, such as returning a default value, triggering exception processing, permitting reads but not writes or simply ignoring a write, may be performed.

Also illustrated in FIG. 1 are another type of hardware resources comprising a plurality of context pointers 18. These context pointers store address values indicating where context data for programming the system MMU 10 in respect of its current context/mode is stored within the memory 4. Thus, when a change of context/mode is made this configuration data is made for the system MMU 10 may be rapidly retrieved into the MMU 10 and the current data stored out to the memory 4. The context/mode may correspond to whether the processor core 8 is current operating in the secure domain or the non-secure domain of an ARM Trustzone system.

Associated with the plurality of context pointers (plurality of hardware resources with a predetermined sequence, e.g. pointer number) there are provided a context pointer boundary register 20 storing a boundary value dividing the context pointers into a first portion and a second portion as well as a context pointer control circuit 22 responsive to the domain at which the processor core 8 is operating to control access by a program instruction to the context pointers 18. As previously described in relation to the performance monitoring circuitry 12, the context pointers 18 are divided into a first portion and a second portion within their predetermined sequence by the context pointer boundary value stored within the context pointer boundary register 20. Control logic responsive to the context pointers responds to an executing first program instruction querying how many of the hardware resources are present to return a first value, which may be the number of context pointers within the first portion or the sum of the context pointers within the first portion and the second portion. The first program which has access to the first portion is permitted to write the boundary value within the context pointer boundary register 20. A second program which has access to the second portion of the context pointers 18 is not permitted to write the context pointer boundary value and when it queries the number of context pointers present is returned a value corresponding to the number of context pointers from the second portion.

Figure 2:
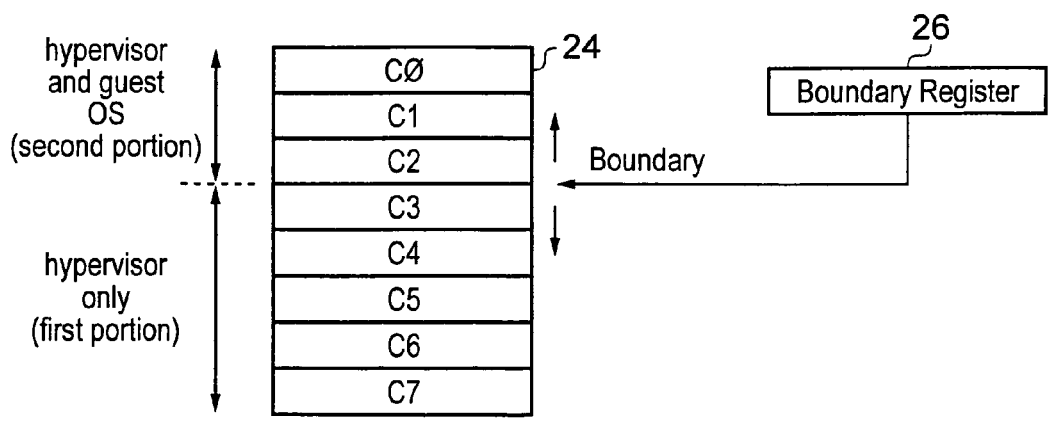
FIG. 2 schematically illustrates a plurality of hardware resources divided into a first portion and second portion at a boundary specified by a boundary value held within a boundary register.

FIG. 2 schematically illustrates a plurality of hardware resources C0 to C7. These hardware resources 24 have a predetermined sequence corresponding to their numerical position within the plurality of hardware resources. A boundary value stored within a boundary register 26 indicates a boundary position within this sequence. The boundary value is a variable and accordingly the position of the boundary may be varied by writing to the boundary register 26.

In the example illustrated, the first portion of the hardware resources comprises the registers C3 to C7. The second portion of the hardware resources corresponds to the registers C0 to C2. The first portion of the hardware resources is only accessible by a secure program executing in the secure domain. The second portion of the hardware resources is accessible both to the secure program executing in the secure domain and a non-secure program executing in the non-secure domain. As will be familiar to those in this technical field, a secure program is typically responsible for at least partially virtualising the underlying hardware architecture of a integrated circuit 6 and providing a virtual hardware interface to a non-secure program so as to provide services to the non-secure software in a protected manner.

Both the secure program and the non-secure system need to query the number of hardware resources 24 which are available as this may vary from implementation to implementation. However, the value returned in response to such query in accordance with the present technique will vary depending upon whether or not it is the secure program executing in the secure domain is issuing the query or a non-secure program operating in the non-secure domain. The secure program will be returned the true total number of the resources which are present whereas the non-secure program will be returned a number corresponding to those hardware resources present within the second portion. In this way, the hardware resources within the first portion may be hidden from the non-secure program and reserved for use by the secure program.

The position of the boundary as controlled by the boundary value stored within the boundary register 26 may be varied by writing a boundary value into the boundary register 26. The secure program may write to the boundary register 26. The non-secure and other programs in the non-secure domain are not permitted to write to the boundary register 26.

The system MMU 10 provides address translation and protection services for device generated accesses in a similar way to how a processor MMU provides them for processor generated accesses. The primary difference with the system MMU is the number of concurrent translation configurations supported.

A processor MMU generally supports only one active context, in that it supports the translation for one "world" of software at a time. A supervisory piece of software like a hypervisor will arrange to switch this state when it timeslices the execution of guest OSes, and each guest OS will perform an equivalent operation when timeslicing the execution of applications.

A System MMU 10 supports translating accesses from a number of devices within a short space of time/concurrently, potentially providing separate translation/protection to each device.

Using a system deploying the ARM TrustZone technology as an example, the System MMU 10 might support translating transactions from two sets of devices:
 1. Those devices configured by Secure software
 2. Those devices configured by non-secure software The process of translating a transaction requires some context that configures the translation process (e.g. translation table base pointer registers, translation table control registers). Under the System MMU 10, each different set of translations that are desired will require a separate translation context. The System MMU 10 will therefore provide a pool of translation contexts, and it is desirable to find a way that the System MMU 10 can share these contexts in a simple fashion between secure and non-secure software.

Consistent with the approach to security with a system deploying the ARM TrustZone technology, non-secure software should not be able to observe or affect secure-owned translation context. Further, non-secure software must not be able to claim all of the translation context in case secure software has a need to use services provided by the System MMU. The proposed solution is to implement a boundary register that splits the pool of translation contexts into two sets—one for the secure software and one for the non-secure software. This approach has the benefit of providing direct access to the appropriate part of the context pool to non-secure software, no secure software intervention is required.

A further benefit in this System MMU example is where different behaviour is desired from the resource dependent on whether a resource resides in the first or second portion. For example, a translation context residing within the first portion may have a different format to a translation context residing in the second portion. This format selection can be made dependent upon the boundary value, such that the resources are designed to be capable of supporting both formats and select which format they present based on whether they fall within the first or second portion.

In the System MMU 10, as well as using the boundary value to split translation contexts into two groups (secure, non-secure), the translation contexts in the non-secure group are split into two portions using a further boundary value. These portions provide either first or second stage translation context formats, which provide for the translation from virtual address to intermediate physical address and from intermediate physical address to physical address, respectively. The first stage translation context formats are provided for use by a Guest OS; the second stage translation context formats are provided for the Hypervisor. The System MMU 10 may additionally be configured for nested translation, where the output of a first stage translation feeds into the input of a second stage translation, thus performing an address translation from virtual address to physical address in the context of a virtualized system.

The Hypervisor may permit access to the portion in the non-secure group performing first stage translation to the Guest OSes that it is virtualizing; the portion performing the second stage translation will be inaccessible to the Guest OSes.

Figure 3:
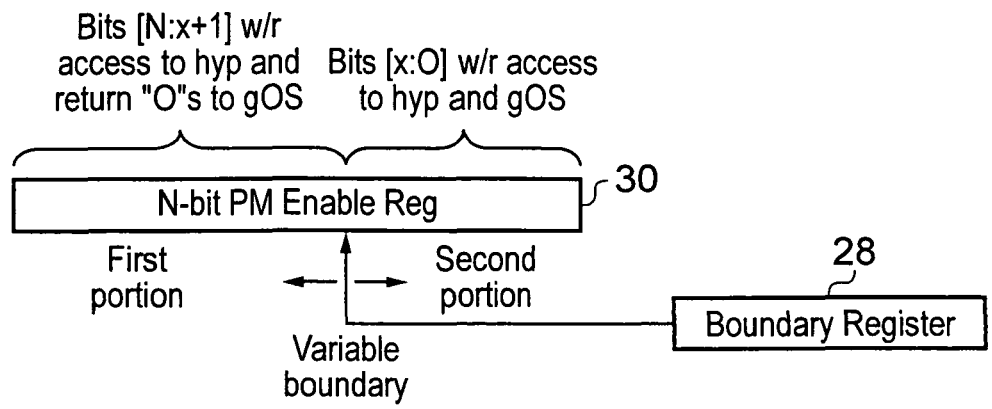
FIG. 3 schematically illustrates a plurality of resources being control bits within a register and divided into a first portion and a second portion by a boundary value held within a boundary register.

FIG. 3 illustrates another example of a plurality of hardware resources which may be managed in accordance with the present techniques. In this example, the plurality of hardware resources comprise control bits within a control register which is accessed as a whole (i.e. is read or written as a whole). Each of the bits within this register shown in FIG. 3 serves to control whether a corresponding performance monitor (e.g. performance counter circuit) is enabled or disabled. A boundary value stored within a boundary register 28 divides the bits within the performance monitor enable register 30 into a first portion and a second portion. The enable bits within the first portion are subject to read and write access by a hypervisor program, but may not be validly accessed by guest operating system. As examples of default actions when access is not permitted, a write by a guest operating system to one of these bits is ignored and if a read of one of these bits is made by the guest operating system then a value of "0" is returned irrespective of what is the actual value of the bit concerned as set by the hypervisor (or the actual value may be returned). The second portion of the enable register 30 is subject to both read and write access by the hypervisor program and the guest operating system.

In this example it will be seen that the enable bits within the performance monitor enable register 30 are hardware resources to which selective access is granted under control of a boundary value stored within the boundary register 28. The underlying performance counters are also hardware resources to which selected accesses permitted.

Another possible feature of these techniques is the provision of global control registers (such as global enable registers for hardware features e.g. switching on dynamic voltage scaling), and these gain shadow values when there is a split in resource provision. Thus, in place of a single global enable register (which is the programmers model of the virtual machine presented to the guest operating system), there are two: a first global enable register controlling the first portion and a second global enable register controlling the second portion. The second enable register corresponds to the global enable of the virtual machine.

Figure 4:
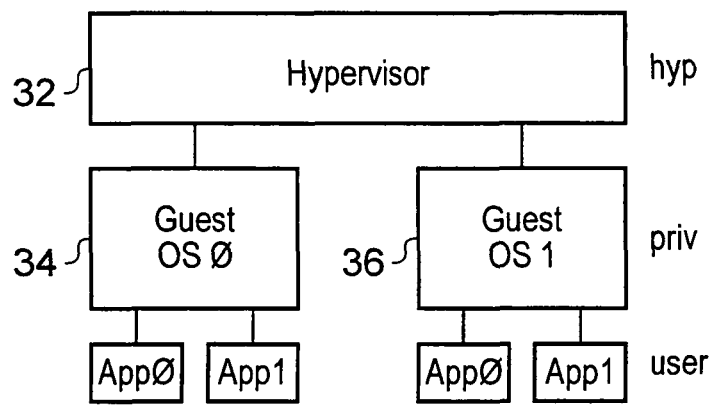
FIG. 4 illustrates a hierarchy of different programs operating at different privilege levels.

FIG. 4 schematically illustrates an arrangement of a plurality of programs which may be executed by a processor 6. A hypervisor program 32 is responsible for virtualisation of the processor 6 to two underlying guest operating systems 34, 36. Each of these guest operating systems 34, 36 is provided with an interface to the processor 6 managed by the hypervisor program 32 to give the guest operating system 34, 36 an environment corresponding to a virtual processor which may not be of the true physical form of the physical processor 6. As an example, the processor 6 may have and control a larger number of hardware resources than those to which the guest operating systems 34, 36 are permitted access with some of these hardware resources being reserved for use by the hypervisor 32. When a guest operating system 34, 36 queries the number of hardware resources available, it is returned a value which does not represent the true value for the number of hardware resources present.

Also illustrated in FIG. 4 are respective application programs executed under control of respective guest operating systems 34, 36 together with the different levels of privilege associated with the different programs illustrated, namely a hypervisor level of privilege, a privileged level of privilege and a user level of privilege. This arrangement will be familiar to those in this technical field.

Figure 5:
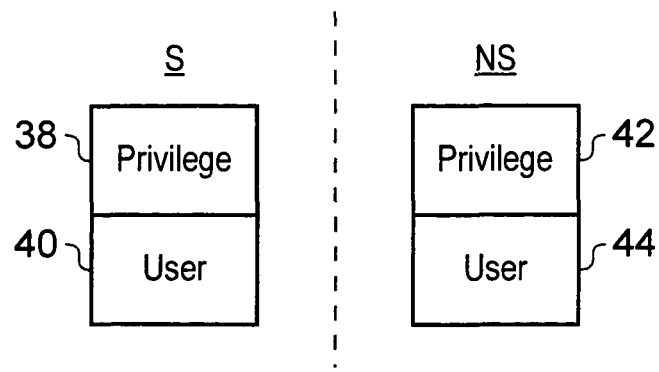
FIG. 5 illustrates another arrangement of privilege levels in a system having a secure domain and a non-secure domain.

FIG. 5 illustrates another example of an arrangement of different programs with different levels of privilege. In the arrangement of FIG. 5 there is also a secure domain S and a non-secure domain NS. Within the secure domain there is privileged level code 38 operating at a privileged level of privilege and user code 40 operating at a user level of privilege. Within the non-secure domain there is in a similar way privileged code 42 operating at a privileged level of privilege and user code 44 operating at a user level of privilege. Within this environment only program code executing within the secure domain has access to the first portion of hardware resources, whereas program code operating in the non-secure domain does not have access to hardware resources within this first portion.

Figure 6:
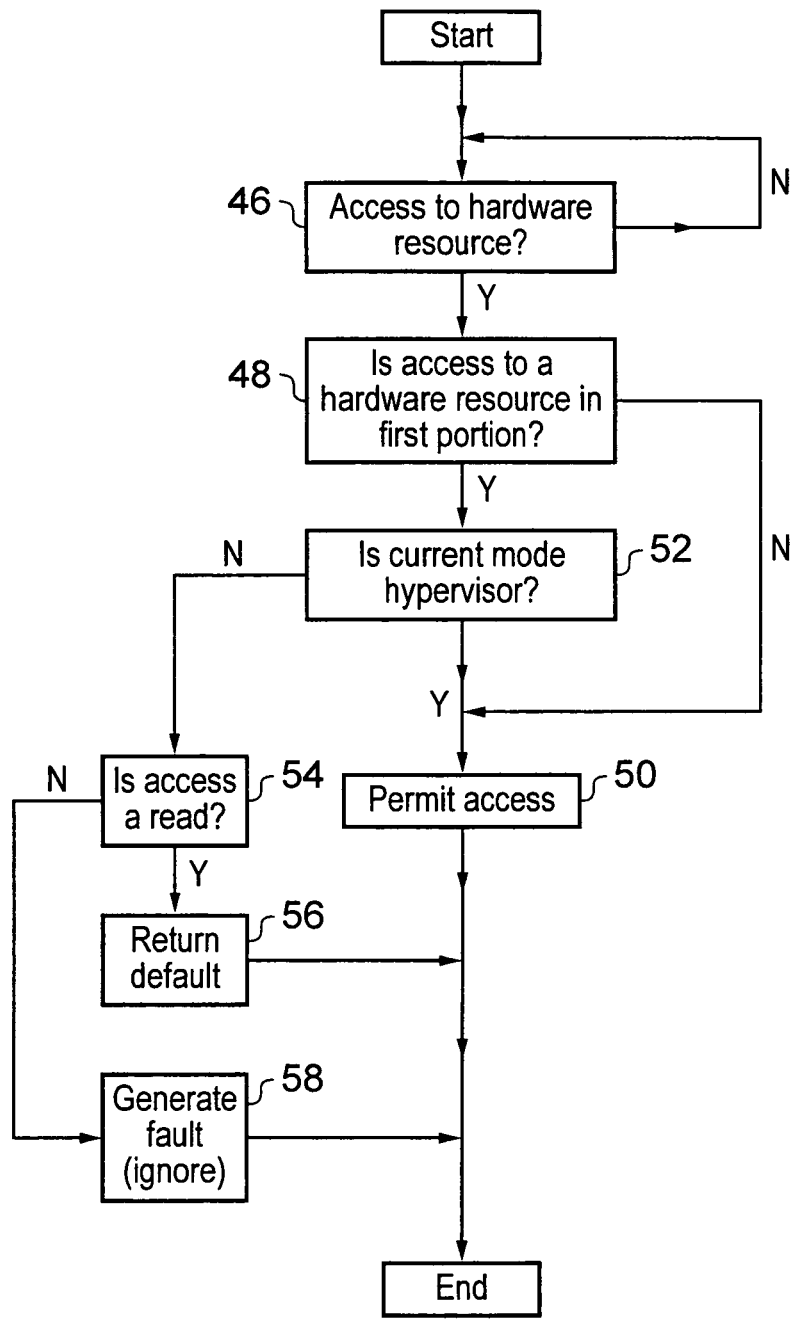
FIG. 6 is a flow diagram illustrating control of access to a hardware resource within a first portion.

FIG. 6 is a flow diagram illustrating processing control performed in response to an access request to a hardware resource. This processing control is performed by the performance monitor control circuit 16 or the context pointer control circuit 22 of FIG. 1.

At step 46 the process waits until an access to a hardware resource is received. At step 48 a determination is made as to whether or not the hardware resource concerned is within the first portion of the plurality of hardware resources. This determination may be made by a comparison between an index value of the hardware resource to which an access is made and the current boundary value specified in either the performance monitor boundary register 14 or the context pointer boundary register 20.

If the access is not to a hardware resource within the first portion, then processing proceeds to step 50 at which the access concerned is permitted. Accesses not within the first portion will be within the second portion to which both the first program and the second program have access irrespective of their privilege level.

If the determination at step 48 is that the access is to a hardware resource within the first portion, then step 52 determines whether or not the current operating mode of the processor 6 is the hypervisor mode. If the current operating mode is the hypervisor mode, then the access concerned is permitted and is performed at step 50. If the current mode is not the hypervisor mode then processing proceeds to step 54. The hypervisor mode is the mode within which a program must be executing if it is to be permitted access to hardware resources within the first portion.

Step 54 determines whether or not the access concerned is a read access. If the access is a read access, then step 56 returns a default value, e.g. "0", in place of the true value. If the access is not a read access as determined at step 54, then step 58 generates a fault and ignores the write access. Other default actions are also possible, such as ignoring writes and returning the actual value on a read.

Figure 7:
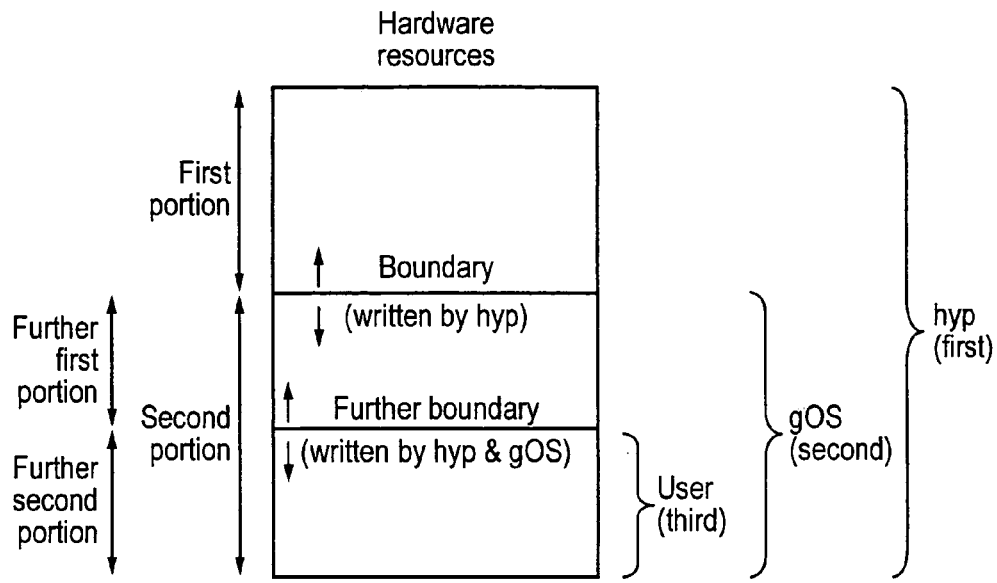
FIG. 7 illustrates the division of hardware resources with a boundary and a further boundary.

FIG. 7 schematically illustrates how hardware resources may be divided by the present techniques with more than one boundary. A first boundary written by a hypervisor splits the hardware resources into a first portion accessible only to the hypervisor and a second portion accessible to both the hypervisor and a guest operating system. A further boundary value written either by the hypervisor or the guest operating system splits the second portion into a further first portion and a further second portion. The further first portion is assessable both to the hypervisor program and the guest operating system program. The further second portion is accessible to the hypervisor program, the guest operating system program and a user program.

When a user program at the user level of privilege queries the number of hardware resources present, a value is returned corresponding to the number of hardware resources within the further second portion. When the guest operating system operating at a privileged level of privilege queries the number of hardware resources present, a value is returned corresponding to the number of hardware resources within the second portion. When the hypervisor program issues a query regarding the number of hardware resources present from its position within the hypervisor mode of privilege, the true value of the number of hardware resources is returned corresponding to the sum of the number of hardware resources within the first portion and the second portion.

As well as returning different values in response to queries regarding the number of resources present, the resource control circuitry 16, 22 re-indexes the hardware resources such that accesses for each program appear to start at a same given point (index value) irrespective of their actual position within the true sequence of hardware resources that are physically present. Thus, for example, each program whatever level of privilege it is executing at and whichever portion of the hardware resources it is allowed to access, will be provided with indexes to those hardware resources which all start at a fixed value, e.g. all of the indexes may start at the value "0" and extend upward from this value irrespective of their position within the true physical hardware resources. In the example of FIG. 2, the second portion indices are naturally rooted at "0" and the first portion entries are re-indexed to start at "0".

Figure 8:
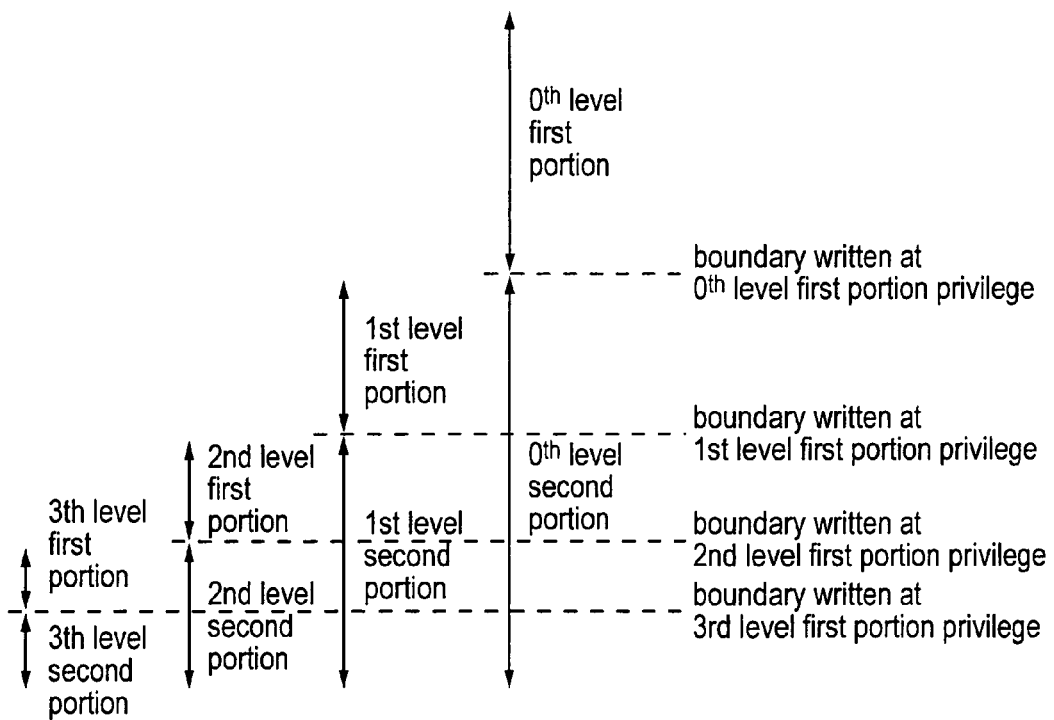
FIG. 8 schematically illustrates multiple boundaries dividing a plurality of resources with respective boundary values written by programs at different privilege levels.

FIG. 8 illustrates a further example of the division of hardware resources into different portions. In this example there are four boundary values illustrated each of which serves to sub divide the hardware resources further. In the example given, privilege extends from a 0th level to a 3rd level with the 0th level boundary value being permitted to be written only by a program operating at the 0th level of privilege. The 1st level boundary value may be written by a program at the first level of privilege or higher. In a similar way, further boundary values subdivide a portion of the hardware resources to which their corresponding level of privilege has access into further first portion and second portion divisions with the boundary value fixing the position of the boundary being writable by a program executing at the corresponding level of privilege or above. Thus, it will be seen from FIG. 8 that a hierarchy of subdivisions of the hardware resources may be made with a plurality of boundary values writeable at respective levels of privilege.

Figure 9:
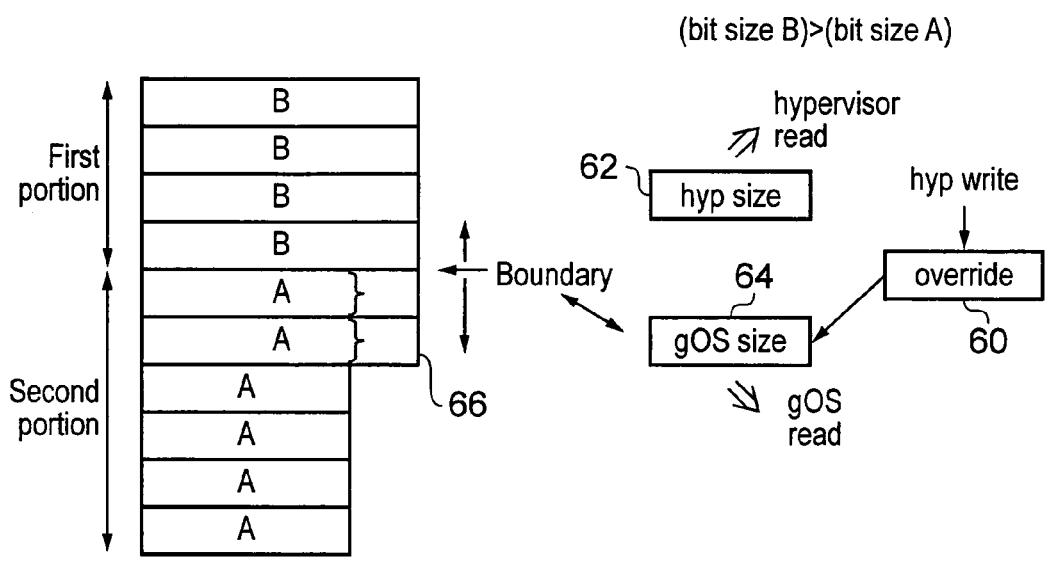
FIG. 9 illustrates a plurality of hardware resources in the form of a table of pointers to storage locations of memory management unit configurations.

FIG. 9 schematically illustrates another example of hardware resources, in this case corresponding to a table of pointers to memory addresses storing context data for a memory management unit (MMU). The boundary between the first portion and the second portion is stored within an override register 60. This override register 60 may only be written by the hypervisor program executing at the hypervisor level of privilege. A hypervisor size register 62 stores a value indicating the true total number of the registers falling within the first portion and the second portion of FIG. 9. A guest operating system size register 64 is provided which returns a value for the number of pointer values available when read by a guest operating system program executing a privileged level of privilege. This guest operating system size as stored within the guest operating system size register 64 has a default value corresponding to position 66. This default value will be returned in response to a read from the guest operating system unless the override register 60 has been written by the hypervisor program with a different value shifting the boundary to a position other than the default position 66. This is the situation illustrated in FIG. 9. Thus, a default number of hardware resources may be provided to the guest operating system and the hypervisor program may selectively provide more hardware resources to the guest operating system if appropriate.

In this example, the pointer values that are used by the guest operating system are smaller than those required by the hypervisor. Thus, if pointers which would normally be used only by the hypervisor are allocated for use by the guest operating system, then they will have an excess of bit space over that required to store the smaller pointer for the guest operating system. This extra space can simply be ignored.

Figure 10:
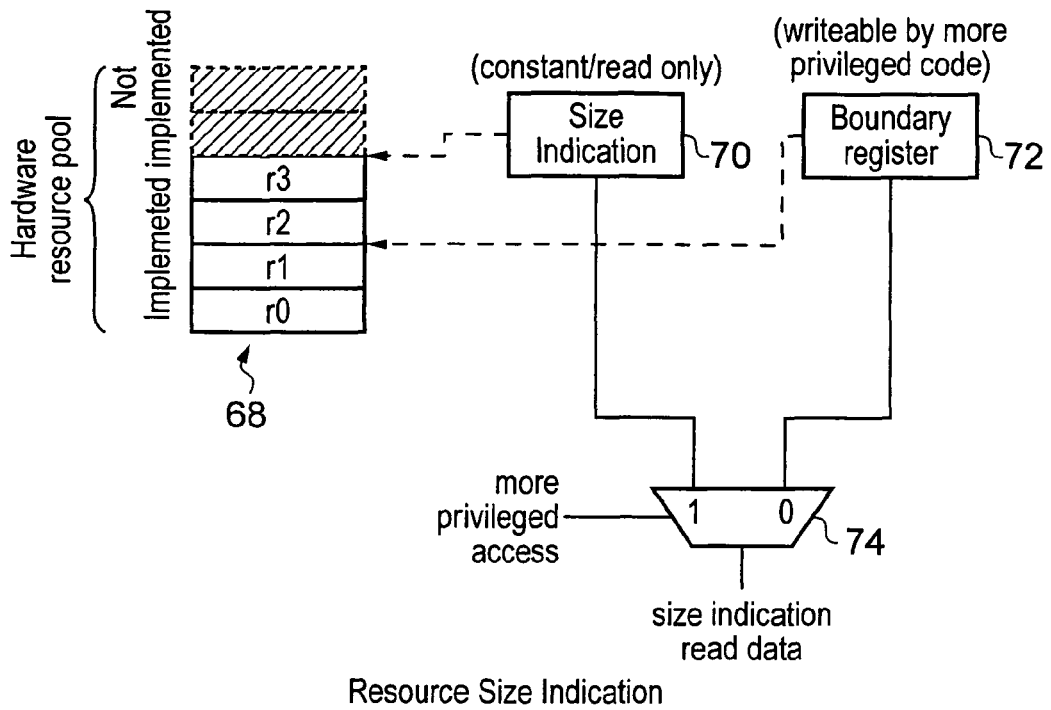
FIG. 10 schematically illustrates circuitry for reading a resource size indication.

FIG. 10 schematically illustrates resource size indicating circuitry. The hardware resources provided are a pool of registers 68. A size indication register 70, which stores a constant or read only value, points to a value indicating the total number of implemented registers in the system concerned. A boundary register 72 which is writeable by more privileged level code indicates a boundary position which will be provided as a resource size indication when operating at lower levels of privilege. A multiplexer 74 switches between providing the value stored within the size indication register 70 and the value stored within the boundary register 72 in response to a read request for the size data in dependence upon a multiplex switching signal indicating a more privileged level of access being current. Thus, from a software point of view the size indication can always be considered as being stored within a fixed register, but when that register is read the value returned will either be from the size indication register 70 or the boundary register 72 depending upon the current mode of privilege within which the system is operating. More privileged levels of code can write to the boundary registers 72 and accordingly may vary the resource size as seen by less privileged levels of code. The value stored within the size indication register may be hardware implementation specific and return a value to be used by the more privileged level of code.

Figure 11:
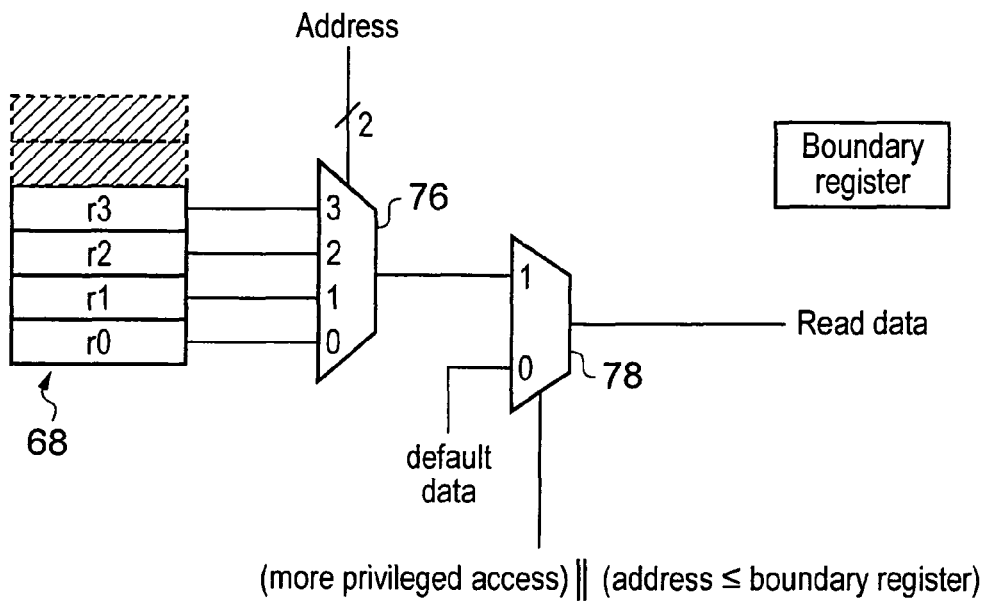
FIG. 11 schematically illustrates circuitry for reading a resource when the present watermarking techniques are employed.

FIG. 11 schematically illustrates circuitry for reading one of the resources. A multiplexer 76 selects one of the resource registers to read in dependence upon a decoded address. However, a further multiplexer 78 will return a fixed default value for the content of the resource being read if the resource being read is outside of the range of resource registers which are available in that mode. Accordingly, the multiplexer 78 will switch the default value into the read data output unless either the system is operating in the more privileged access mode or the address of the resource being accessed is less than or equal to the value stored within the boundary register which is set up to be the limit of the range of resource addresses that is available to the system when operating at lower levels of privilege access.

Figure 12:
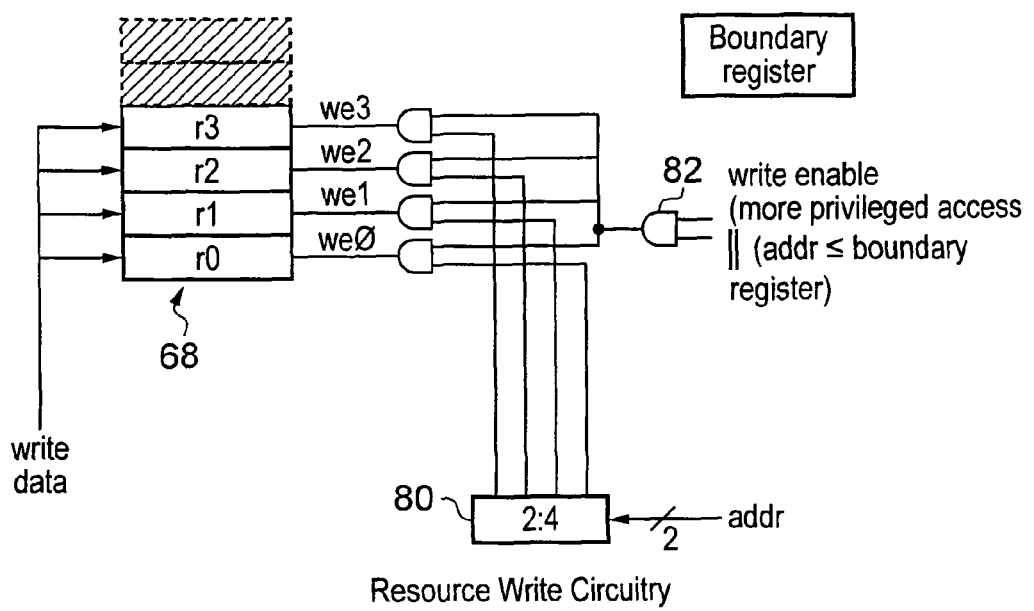
FIG. 12 schematically illustrates a circuit for writing a resource when the present watermarking techniques are used.

FIG. 12 schematically illustrates a circuitry for writing to the resources 68. In this arrangement the address of the write is sent to a decoder 80 which generates a one-hot signal supplied as a write enable to the appropriate one of the registers within the resources 68. This signal from the decoder 80 is subject to an AND operation with a further signal from an access controlling AND gate 82. The access controlling AND gate 82 ANDs a write enable signal together with a signal indicating that either the system is operating in a more privileged mode of access or that the address of the register being accessed is less than or equal to the boundary position for the registers accessible at lower levels of privilege. Thus, at more privileged levels of access, any of the registers can be written whereas at lower levels of privilege only the registers at or below the boundary can be written. A write to a register outside of the permitted range at a lower level of privilege will simply be as the write enable signal will not be generated even though the write data is applied at the input to the register.

The configuration data pointed to by the pointers of FIG. 9 can take a variety of different forms. This configuration data is used by the memory management 10 of FIG. 1. The configuration data can comprise one or more of: translation table base pointer register values; fault address and context register values; translation look aside buffer maintenance register values; virtual address to physical address operation register values; memory management unit configuration and control register values; context bank values comprising translation table base pointer register values, fault address and context register values, translation look aside buffer maintenance register values, virtual, address to physical address operation register values and memory management unit configuration and control register values; bypass attribute register values; interrupt outputs raised in response to activity initiated by one or more of said first program and said second program; and transaction identification register values for mapping data streams.

The performance monitoring circuits discussed in relation to FIGS. 1 and 3 can have a variety of different forms. The performance monitoring circuits can comprise one or more of a plurality of counters comprising one or more counter registers, enable registers, overflow status flags and overflow event interrupt enable registers. The performance monitoring circuits may additionally or alternatively comprise event selection circuits for selecting an event to count from within a plurality of events. Within this context, the apparatus may additionally contain a plurality of counters comprising one or more counter registers, enable registers, overflow status flags, and overflow event interrupt enable registers; and event selection circuits for selecting an event to count from a plurality of events. These elements may serve to provide a physical implementation of the arrangement of FIG. 3. The performance monitor enable register 30 logically illustrated in FIG. 3 may in practice be physically provided by the various enable registers discussed above.

Another form of hardware resource to which the present technique may be applied is a plurality of registers for use by a first program or a second program. These registers may, for example, be a plurality of mapping registers storing mappings to be used between data streams being accessed and associated processing context of the apparatus. Thus, as the apparatus switches context, the new mapping may be made rapidly available to the new context as it is stored within a physical register comprising one of the hardware resources of the system.

A further use of the present techniques may be in the management of debug/diagnostic event generation resources. For example, break point and watch point resources that are physically provided may be virtualised in accordance with the present technique to program executing at lower levels within the virtualisation hierarchy. These break point and watch point resources may be break point comparators and watch point comparators in one example. Other examples of diagnostic resources which may be managed in accordance with the present techniques are address comparators within a trace data generation unit of a processor 6. Other examples of resources which may be managed in accordance with the present techniques will be apparent to those in this technical field.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of a plurality of programs, said apparatus comprising:
a plurality of hardware resources with a predetermined sequence such that each of said plurality of hardware resources has a predetermined position within said sequence;
boundary indicating circuitry configured to store a boundary value indicating a boundary position within said sequence, said boundary position dividing said sequence into a first portion on a first side of said boundary position within said sequence and a second portion on a second side of said boundary position within said sequence;
program instruction execution circuitry configured to execute program instructions;
resource control circuitry coupled to said boundary indicating circuitry and configured:
when said program execution circuitry is executing a first program, to respond to one or more program instructions querying how many of said plurality of hardware resources are present within said apparatus to return a first value; and
when said program execution circuitry is executing a second program, to respond to one or more program instructions querying how many of said plurality of hardware resources are present within said apparatus to return a value corresponding to those hardware resources within said second portion.

2. Apparatus as claimed in claim 1, wherein said first value corresponds to a sum of those hardware resource within said first portion and said second portion.

3. Apparatus as claimed in claim 1, wherein said first value corresponds to those hardware resources within said first portion.

4. Apparatus as claimed in claim 1, wherein
said program instruction execution circuitry is configured to operate at selectable one of a plurality of privilege levels, different privilege levels within said plurality of privilege levels having different access rights to said plurality of hardware resources; and
said resource control circuitry is configured such that:
when said program execution circuitry is operating at a first privilege level executing said first program, permitting said boundary value to be written under program instruction control; and
when said program execution circuitry is operating at a second privilege level executing said second program, not permitting said boundary value to be written under program instruction control.

5. Apparatus as claimed in claim 4, wherein said resource control circuitry is configured such that when said program execution circuitry is operating at said second privilege level, one or more program instructions seeking to access hardware resources within said first portion are permitted fewer access rights to said hardware resources within said first portion than when said program execution circuitry is operating at said first privilege level.

6. Apparatus as claimed in claim 5, wherein when said program execution circuitry is operating at said second privilege level, said one or more program instructions seeking to access hardware resources within said first portion are permitted no access rights to said hardware resources within said first portion.

7. Apparatus as claimed in claim 5, wherein said plurality of privilege levels comprise a hierarchy of privilege levels, said first privilege level being higher in said hierarchy than said second privilege level and any given level of privilege within said hierarchy has a proper superset of access rights to said hardware resources compared to any privilege level lower in said hierarchy than said given level.

8. Apparatus as claimed in claim 4, wherein said plurality of different privilege levels include a hypervisor privilege level at which a hypervisor program executes and an operating system privilege level at which an operating system program executes, said hypervisor program having access to those hardware resources within said first portion and those hardware resources within said second portion and said operating system program having access to those hardware resources within said second portion.

9. Apparatus as claimed in claim 4, wherein said plurality of different privilege levels include at least one secure privilege level within a secure domain at which a secure program executes and at least one non-secure privilege level within a non-secure domain at which a non-secure program executes, said secure program having access to those hardware resources within said first portion and those hardware resources within said second portion and said non-secure program having access to those hardware resources within said second portion.

10. Apparatus as claimed in claim 1, wherein when said one or more program instructions of said first program querying how many of said plurality of hardware resources are present within said apparatus return a true value for how many of said plurality of hardware resources are present within said apparatus return and said one or more program instructions of said second program querying how many of said plurality of hardware resources are present within said apparatus return a value specified by said boundary value.

11. Apparatus as claimed in claim 1, wherein said boundary indicating circuitry is configured to store a further boundary value, said further boundary value dividing said second portion into a further first portion and a further second portion, said resource control circuitry being configured:
when said program execution circuitry is operating at said second privilege level, to permit said further boundary value to be written under program instruction control and to respond to one or more program instructions querying how many of said plurality of hardware resources are present within said apparatus to return a value corresponding a sum of those hardware resource within said further first portion and said further second portion; and
when said program execution circuitry is operating at a third privilege level, to not permit said further boundary value to be written under program instruction control, and to respond to one or more program instructions querying how many of said plurality of hardware resources are present within said apparatus to return a value corresponding those hardware resource within said further second portion.

12. Apparatus as claimed in claim 1, wherein said boundary indicating circuitry is configured to store N further boundary values, where N is a non-zero positive integer, said N further boundary values forming a sequence of boundary values starting with said boundary value, an $n^{th}$ boundary value within said sequence of boundary values dividing a second portion defined by an $(n-1)^{st}$ boundary value within said sequence of boundary values into an $n^{th}$ first portion and an $n^{th}$ second portion, said resource control circuitry being configured:
when said program execution circuitry is operating at a second privilege level with respect to said $n-1^{st}$ boundary value, to permit said $n^{th}$ boundary value boundary value to be written under program instruction control and to respond to one or more program instructions querying how many of said plurality of hardware resources are present within said apparatus to return a value corresponding a sum of those hardware resource within said $n^{th}$ first portion and said $n^{th}$ second portion; and
when said program execution circuitry is operating at a second privilege level with respect to said $n^{th}$ boundary value, not to permit said $n^{th}$ boundary value boundary value to be written under program instruction control and to respond to one or more program instructions querying how many of said plurality of hardware resources are present within said apparatus to return a value corresponding those hardware resource within said $n^{th}$ second portion.

13. Apparatus as claimed in claim 1, wherein said plurality of hardware resources comprise storage for a plurality of entries within a table of pointers to configuration data of a memory management unit.

14. Apparatus as claimed in claim 13, wherein said configuration data comprises one or more of:
translation table base pointer register values;
fault address and context register values;
translation look aside buffer maintenance register values;
virtual address to physical address operation register values;
memory management unit configuration and control register values;
context bank values comprising translation table base pointer register values, fault address and context register values, translation look aside buffer maintenance register values, virtual, address to physical address operation register values and memory management unit configuration and control register values;

bypass attribute register values;

interrupt outputs raised in response to activity initiated by one or more of said first program and said second program; and transaction identification register values for mapping data streams.

15. Apparatus as claimed in claim 1, wherein said plurality of hardware resources comprise a plurality of performance monitoring circuits.

16. Apparatus as claimed in claim 15, wherein said plurality of performance monitoring circuits comprise one or more of:

a plurality of counters comprising one or more of counter registers, enable registers, overflow status flags, and overflow event interrupt enable registers; and event selection circuits for selecting an event to count from a plurality of events.

17. Apparatus as claimed in claim 15, comprising one or more of:

a global enable register for selectively enabling said plurality of performance monitoring circuits;

a shadow global enable register accessible to said first program for selectively enabling said plurality of performance monitoring circuits within said first portion and an architected global enable register accessible to said first program and said second program for selectively enabling said plurality of performance monitoring circuits within said second portion.

18. Apparatus as claimed in claim 1, wherein said plurality of hardware resources comprise a plurality of fields of a register accessed as a whole and being one of a configuration register and a status register with each of said plurality fields representing a respective further resource, said boundary value specifying which of said plurality of fields are accessible to said first program and which of said plurality of fields are accessible to said second program.

19. Apparatus as claimed in 18, wherein said plurality of hardware resources comprise fields of one or more bits within a configuration register corresponding to respective ones of a plurality of performance monitoring circuits, each field controlling whether a corresponding performance monitoring circuit of said plurality of performance monitoring circuits is enabled.

20. Apparatus as claimed in claim 1, wherein said plurality of hardware resources comprise a plurality of registers for use by said first program or said second program.

21. Apparatus as claimed in claim 1, wherein said plurality of hardware resources comprise a plurality of mapping registers storing mappings to be used between data streams being accessed and associated processing contexts of said apparatus.

22. Apparatus as claimed in claim 1, wherein said plurality of hardware resources comprise at least one of a plurality of break point registers and a plurality of watchpoint registers.

23. Apparatus as claimed in claim 1, wherein if said second program attempts to read a hardware resource within said second portion then default value for said hardware resource is returned.

24. Apparatus as claimed in claim 1, wherein if said second program attempts to write a hardware resource within said second portion then said write is not performed.

25. Apparatus as claimed in claim 1, wherein if said second program attempts to access a hardware resource within said second portion then said access is abandoned and exception processing is invoked.

26. Apparatus as claimed in claim 1, wherein said resource control circuitry re-indexes said plurality of hardware resources in dependence upon said boundary value.

27. Apparatus for processing data under control of a plurality of programs, said apparatus comprising:

a plurality of hardware resource means with a predetermined sequence such that each of said plurality of hardware resource means has a predetermined position within said sequence;

boundary indicating means for storing a boundary value indicating a boundary position within said sequence, said boundary position dividing said sequence into a first portion on a first side of said boundary position within said sequence and a second portion on a second side of said boundary position within said sequence;

program instruction execution means for executing program instructions;

resource control means coupled to said boundary indicating means for:

when said program execution means is executing a first program, responding to one or more program instructions querying how many of said plurality of hardware resource means are present within said apparatus to return a first value; and when said program execution means is executing a second program, responding to one or more program instructions querying how many of said plurality of hardware resources are present within said apparatus to return a value corresponding to those hardware resource means within said second portion.

28. A method of processing data under control of a plurality of programs with an apparatus having a plurality of hardware resources with a predetermined sequence such that each of said plurality of hardware resources has a predetermined position within said sequence, said method comprising the steps of:

storing, by a boundary indicating circuitry, a boundary value indicating a boundary position within said sequence, said boundary position dividing said sequence into a first portion on a first side of said boundary position within said sequence and a second portion on a second side of said boundary position within said sequence;

when said program execution circuitry is executing a first program, responding, by a resource control circuitry, to one or more program instructions querying how many of said plurality of hardware resources are present within said apparatus to return a first value; and when said program execution circuitry is executing a second program, responding, by the resource control circuitry, to one or more program instructions querying how many of said plurality of hardware resources are present within said apparatus to return a value corresponding to those hardware resources within said second portion.

* * * * *